United States Patent [19]

Nishio et al.

[11] Patent Number: 5,250,242

[45] Date of Patent: Oct. 5, 1993

[54] METHOD OF PRODUCING CERAMIC SINTERED BODY HAVING DENSE CERAMIC MEMBRANE

[75] Inventors: Hiroaki Nishio; Keiji Watanabe; Michitaka Sato, all of Tokyo, Japan

[73] Assignee: NKK Corporation, Tokyo, Japan

[21] Appl. No.: 623,452

[22] PCT Filed: Apr. 17, 1990

[86] PCT No.: PCT/JP90/00500

§ 371 Date: Dec. 18, 1990

§ 102(e) Date: Dec. 18, 1990

[87] PCT Pub. No.: WO90/12770

PCT Pub. Date: Nov. 1, 1990

[30] Foreign Application Priority Data

Apr. 18, 1989 [JP] Japan ................. 1-96459

[51] Int. Cl.$^5$ ............................................ C04B 41/85
[52] U.S. Cl. .......................................... 264/60; 264/62; 264/67
[58] Field of Search ......................... 264/62, 60, 67

[56] References Cited

U.S. PATENT DOCUMENTS

| | | | |
|---|---|---|---|
| 4,242,294 | 12/1980 | Huther | 264/62 |
| 4,310,477 | 1/1982 | Uy | 264/62 |
| 4,351,858 | 9/1982 | Hunold | 427/193 |
| 4,568,516 | 2/1986 | Adlerborn | 264/62 |
| 4,643,858 | 2/1987 | Mizutani | 264/62 |

FOREIGN PATENT DOCUMENTS

| | | |
|---|---|---|
| 0035784 | 9/1981 | European Pat. Off. . |
| 354376 | 2/1990 | European Pat. Off. . |
| 2179462 | 11/1973 | France . |
| 2339582 | 8/1977 | France . |
| 63-173675 | 7/1988 | Japan . |

OTHER PUBLICATIONS

Chemical Abstracts, vol. 104, No. 20, abstract 173213R.
American Ceramic Society Bulletin, vol. 65, No. 9, pp. 1306–1311.
World Patent Index, Abstract of JP-A-60039001 (Nippon Tungsten KK).

*Primary Examiner*—James Derrington
*Attorney, Agent, or Firm*—Sughrue, Mion, Zinn, Macpeak & Seas

[57] ABSTRACT

A method of producing a ceramic sintered body having a ceramic membrane which comprises a process of applying a precursor capable of converting into a ceramic membrane having a new function through heating onto at least a portion of a ceramic porous body to impart said function of the surface of the ceramic porous body, a process of applying a precursor capable of converting into a gas-impermeable membrane through heating over the whole surface of the porous body, a process of forming the gas-impermeable membrane by heating, a process of conducting hot isostatic pressing to the porous body, and a process of removing said gas-impermeable membrane. Ceramic sintered bodies having a dense ceramic membrane on the surface can be produced efficiently in very short processes.

12 Claims, 3 Drawing Sheets

METHOD OF PRODUCING CERAMIC SINTERED BODY HAVING DENSE CERAMIC MEMBRANE

TECHNICAL FIELD

This invention relates to a method of producing a ceramic sintered body having a dense ceramic membrane on the surface efficiently.

BACKGROUND ART

Ceramics are superior to metals in heat resistance, corrosion resistance, wear resistance, etc., and are the materials to be hoped. Examples of such ceramics include alumina, silicon nitride, silicon carbide, partially stabilized zirconia, and the like. It is known to impart novel functions in addition to the native properties of the sintered body of the above material by forming the membrane of a foreign ceramic on the surface of the sintered body.

For example, it is known to coat the surface of a silicon nitride sintered body with alumina by CVD. Silicon nitride itself is excellent in strength and toughness, but it tends to react with iron. Therefore, the uses as cutting tools for steel materials are restricted, whereas alumina coating prevents the reaction of silicon nitride with iron resulting to extend the life of the cutting tools.

Besides, it is also known to increase the resistance to the damage during using it by the thermal spraying of zirconia onto the surface of a silicon nitride sintered body (J. L. Schienle and J. Smyth; High Temperature Coating Study to Reduce Contact Stress Damage of Ceramics, Proc. Twenty-Third Automotive Technology Development Contractors' Coordination Meeting, (1985), p.249).

As mentioned above, as the method of forming a membrane of foreign ceramic on the surface of a ceramic, there are the above methods according to CVD or PVD, and furthermore the method of applying the liquid of metal polymer onto the surface of a sintered body followed by sintering, etc. A dense membrane can be formed by coating the surface of a sintered body by CVD. However, there are the problems that the film-forming speed is small, and the coating takes a lot of time. Furthermore, it is difficult to form an uniform membrane on complex-shaped articles, and the application of this method to big articles is also difficult. There are similar problems in PVD.

Another method of forming ceramic membrane is comprised of coating the surface of a sintered body with the suspension of ceramic powder, the solution of hydroxide, the liquid, paste or solution of metal polymer or the like by spraying, brush coating, immersing or the like, drying, pyrolyzing, and then sintering. Besides, the method of thermal spraying of ceramic powder is also known. The restrictions of these methods to the shape and the size are less than CVD, PVD. However, there is a common disadvantage in these methods. That is, the produced membrane contains pores, and in most cases, atmospheric gas contacts the substrate of the sintered body through the pores, and for example, some objects of the coating, such as the improvement in oxidation resistance, are not achieved.

A method of converting a membrane with much pores to a dense membrane with little pores by the hot isostatic pressing (HIP) is proposed in order to solve the above problem (H. Kuribayashi et al; Ceramic Bulletin, vol.65, No.9, (1986), p1306). This method comprises forming a ceramic membrane on the surface of stainless steel by plasma spraying, sealing it with a vessel of pyrex glass, using argon gas as the pressurizing medium, and subjecting it to HIP. Thus, dense alumina, zirconia and titanium carbide membranes were formed on the surface of stainless steel.

A flow sheet of the method of conducting the above HIP treatment is shown in FIG. 4. Respective processes are explained more concretely. First, a known molding method, such as uniaxial pressing, CIP, extrusion, slurry casting or injection molding, is applied to the raw powder of a ceramic sintered body to obtain a molded body, and various sintering methods are applied to the molded body to obtain a sintered body. As the sintering method, for example, the low pressure sintering method wherein the sintering is conducted under vacuum, ordinary pressure or a pressure of less than 10 atm. is known. In this method, since pores usually remain, it is also known to densify it by further conducting HIP treatment. The method of producing a porous sintered body by preparing a molded body containing metal silicon powder and nitriding by heating in a nitrogen atmosphere to obtain a porous sintered body is also known. The method of obtaining a dense sintered body by sealing a porous body such as a molded body or a porous sintered body with a capsule such as one made of glass, conducting HIP treatment, and removing the capsule is also known. It is also known to obtain a dense sintered body by applying a precursor for a capsule capable of conversion into capsule by heating such as glass powder or metal polymer onto the surface of a porous body by spraying, brush coating or immersing, forming a gas-impermeable membrane by drying, thermal decomposition and sintering, using it as the capsule, conducting HIP treatment, and then removing the capsule. Moreover, the hot pressing (HP) method comprising placing a porous body in a carbon die and uniaxially pressing with heating is also known.

A precursor for a ceramic membrane such as the suspension of ceramic powder, the solution of hydroxide or the liquid, paste or solution of metal polymer is applied to the sintered body thus obtained by means of spraying, brush coating, immersing or the like, and a ceramic membrane formed by conducting drying, thermal decomposition and sintering. The ceramic membrane contains a considerable quantity of pores, though the quantity varies.

The ceramic sintered body having the porous ceramic membrane is sealed with a capsule of glass or refractory metal (tantalum, niobium, etc.), HIP is conducted, and the capsule is removed. Thus, a ceramic sintered body having a dense ceramic membrane is obtained.

As mentioned above, the conventional method shown in FIG. 4 is divided into the process for producing the porous body, the process for producing the sintered body, the process for ceramic coating and the process for densifying the ceramic membrane, and therefore, it has a problem that the total processes are extremely long. This invention has been made in order to solve the above problem, and an object thereof is to obtain a method of producing a ceramic sintered body having a dense membrane of a ceramic which is different from the ceramic composing the substrate of the sintered body through short processes.

DISCLOSURE OF INVENTION

The above object is achieved by applying a precursor capable of converting into a ceramic membrane through heating by a known method onto at least the portion of a ceramic porous body to impart a new function of the surface of a ceramic porous body produced through a known method, subsequently, applying a precursor capable of converting into a gas-impermeable membrane through heating over the whole surface of the porous body, conducting HIP to the porous body, and then removing the gas-impermeable membrane. The method of the invention is briefly shown as a flow sheet in FIG. 1.

BEST MODE FOR CARRYING OUT THE INVENTION

Figure 1:
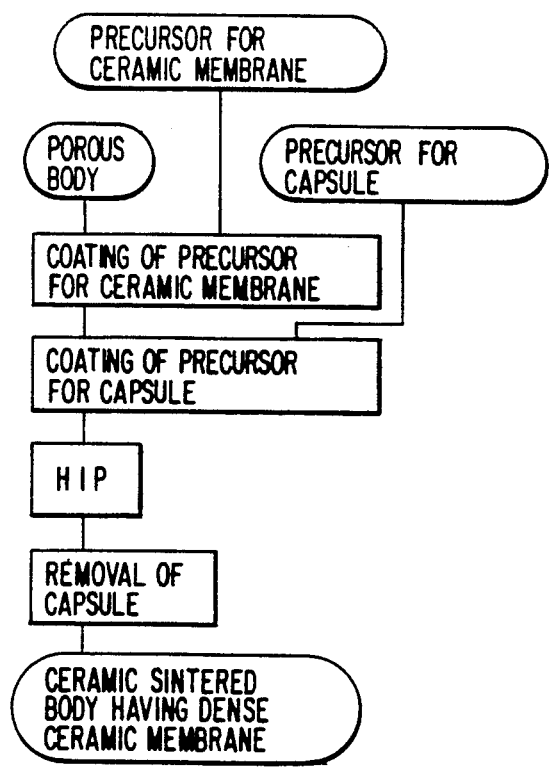
FIG. 1 is a flow sheet indicating the outline of the method of the invention.

The material of the ceramic porous body to which the invention is applied includes nitrides such as silicon nitride, aluminum nitride and boron nitride, carbides such as silicon carbide, chromium carbide and boron carbide, borides such as titanium diboride and zirconium diboride, oxides such as alumina, zirconia and mullite, carbonitrides, oxynitrides and complex oxides. The porous body can be produced, for example, by molding the powder of the above material through a known molding method such as uniaxial pressing, CIP, casting or injection molding, and optional resin and presintering. The porous body may be produced by converting the metal silicon of a molded body of metal silicon powder into silicon nitride through heating up to about 1350° C. in an atmosphere containing nitriding gas, such as reaction-bonded silicon nitride.

The novel function to be imparted to the sintered body of the ceramic porous body is imparted, for example, for the purpose of compensating a defect of the sintered body or imparting another property or the like, and the function is for the improvement of heat resistance, wear resistance, impact resistance, toughness or the like, strengthening of the corrosion resistance for a special material, or the like, according to the kind, use, etc., of the sintered body.

The precursor capable of converting into a ceramic membrane by heating includes aggregates of ceramic particles such as metal oxides, nitrides, carbides and borides and metal polymers such as polysilane, polycarbosilane, polysilazane and hydrolyzates of metal alkoxides. The precursor capable of converting into a ceramic membrane having the desired property is selected from them. For example, the powder of each corresponding material can be used as the precursor of the membrane of stabilized zirconia, titanium nitride, chromium carbide or titanium diboride for the aggregate of the above ceramic powder. They form the precursor converting into the ceramic membrane composed of an aggregate of ceramic particles utilizing the thermal decomposition of an organic binder which is optionally added, or the like. On the other hand, in the case of metal polymer, for example, polysilastyrene and polycarbosilane, such are usable as the precursor of silicon carbide. Inorganic polysilazane is usable as the precursor of silicon nitride, and polymethylsilazane is usable as the precursor of the complex of silicon carbide and silicon nitride. In the case of the hydrolyzates of metal alkoxides, for example, when water is added to tetraethoxysilane ethanol solution, a polymer containing $-OC_2H_5$ or $-OH$ is formed through hydrolysis and polycondensation reaction. The metal polymer is usable as the precursor of silica. Also, a complex ceramic membrane may be produced by mixing a foreign precursor.

In order to apply the precursor onto the surface of the ceramic porous body, a known method (e.g. Japanese Patent Application No. 63-173675) is utilized. The application method may be spraying, brush coating, immersing or the like. When the above method is utilized, it is necessary that the precursor is previously made in a liquid state or a paste state. In the case of ceramic powder, the process of suspending the ceramic powder in a liquid to make a suspension previously is used. The liquid for the suspension may be anyone which does not react with the precursor and can be evaporated, such as water, alcohols such as methanol, ethanol and isopropanol, and acetone. Liquid material at ordinary temperature such as inorganic polysilazane and the precursor which becomes a suspension in the manufacturing process such as hydrolyzates of metal alkoxides can be applied as it is. If necessary, a dispersing agent is added for securing sufficient dispersion of the powder, or an organic binder is added in order to improve the strength of the coating layer. The powder may be made in a paste state by increasing the amount of the organic binder.

The dispersing agent may be a nonionic dispersing agent, an anionic dispersing agent, a cationic dispersing agent or an ampholytic dispersing agent, such as oleic acid, glycerine trioleate or benzenesulfonic acid.

The organic binder includes polyvinyl alcohol, polyvinyl butyral, methyl cellulose, carboxymethyl cellulose, ethyl cellulose, paraffin wax, acrylic binder, low molecular weight polyethylene, etc. In the case of solid metal polymer at ordinary temperature, it is made in a liquid state by dissolving in a solvent so as to apply it. The thickness of the precursor layer converting into the ceramic membrane is usually about 10–500 $\mu$m in dry thickness, through it varies according to the function required for the ceramic membrane or the like. The layer thickness can be controlled by the precursor concentration of the liquid to be applied, and if necessary, recoating may be conducted by repeating applying and drying. The precursor layer converting into the ceramic membrane is not limited to one layer, and it may be composed of plural layers.

The drying after coating may be air-drying, or may be conducted by heating, pressure-reducing, or the like. When the membrane is formed by adding an organic binder and utilizing the thermal decomposition thereof, is a matter of course that to heat up to the temperature capable of decomposing the organic binder is necessary.

The precursor capable of converting into a gas-impermeable membrane used in the invention means an aggregate of particles composed of the metal or ceramic powder capable of softening by heating to close the pores among the particles and to convert the same into a substantially gas-impermeable membrane. The bonding between the particles composing the powder may be strengthened by adding metal polymer.

For example, various glass powders are applicable. As the material of the glass, silica glass, high silica glass, borosilicate glass, aluminosilicate glass, soda silica glass and the like can be enumerated. Silica glass is softened at 1550°-1650° C. High silica glass is softened at about 1500° C. Aluminosilicate glass is softened at 900°-950° C. Borosilicate glass is softened at 800°-850° C. The glass powder may be the powder of which the softening point is raised by adding metal or ceramic powder having a high fire resistance to glass. For example, it may be made of a mixed powder of ceramic such as yttria, alumina or silica, and converted into a high viscosity melt containing crystal particles during heating.

As the means of applying the precursor capable of converting into the gas-impermeable membrane, known methods are applicable similar to the aforementioned precursor capable of converting into the ceramic membrane. The coating thickness is sufficient so as to shield the porous body to be subjected to HIP from gases, and is usually 50-1000 μm in dry thickness.

As mentioned heretofore, at least two layers of the precursor for the ceramic membrane and the precursor for the capsule is formed on the porous body, and a further layer having the other object may be added. For example, a layer to inhibit the strong bonding between both layers induced by heating may be interposed so as to facilitate the separation of the above two layers. For example, in the case that the precursor for the capsule of high silica glass powder is formed on the precursor for the ceramic membrane of silicon nitride powder, a separation layer of boron nitride powder is formed between both layers.

First, the porous body is heated to form the gas-impermeable membrane over the whole surface. The heating temperature is a temperature capable of converting the precursor convertable to a gas-impermeable membrane into the gas-impermeable membrane. When the thermal decomposition of the precursor converting into a ceramic membrane is accompanied with gas evolution, the temperature is made higher than the temperature where the gas evolution is finished. The softening point must be selected so that the gas-impermeable membrane is not flowed down at the temperature where the densification of the porous body and the precursor converting into the ceramic membrane proceeds during the HIP treatment. The heating up to the completion of the impermeable membrane is preferably conducted under the atmosphere of inert gas such as argon gas or nitrogen gas or evacuation. The atmosphere may be made a reducing atmosphere by adding a small amount of hydrogen, carbon monoxide or the like, if necessary. However, when both precursors contain the hydrolyzate of metal alkoxide, the porous body may be heated in the air. Generally, the heating of the porous body may be conducted under an inert gas atmosphere or evacuation, and for example, the heating process can be conducted in a HIP apparatus. To conduct the heating process at a high pressure is not preferred, and a suitable pressure in the case of pressurization is not more than 10 kg/cm² (gauge pressure). The heating time is set at a time necessary for forming the gas-impermeable membrane, and it is usually about 0.5-3 hours, though it varies according to the size of the porous body, heating temperature, the kind of the precursor and the like. The process for forming the gas-impermeable membrane may be separately conducted from the HIP treating apparatus, but to conduct it in the HIP apparatus as a preceding process is convenient.

After forming the gas-impermeable membrane, HIP is conducted according to a known method. As the applied conditions, the temperature is usually about 1000°-2300° C., the pressure is about 1000-3000 atm, and the keeping time is about 0.5-3 hours. The pressurizing medium may be argon, nitrogen or the like.

The removal or the gas-impermeable membrane may be conducted according to a known method, and for example, sandblasting, impacting and scraping are usable.

In order to facilitate the separation of the ceramic membrane and the gas-impermeable membrane which are directly provided on the porous body, a layer composed of a material being hard to be sintered or being weak in strength even though it is sintered may be interposed. For example, boron nitride is effective for this purpose.

As mentioned heretofore, the densification of the porous body and the ceramic membrane is achieved by forming a layer of the precursor converting into the ceramic membrane on the surface of the porous body, further forming a layer of the precursor converting into the gas-impermeable membrane, converting into the gas impermeable membrane, and conducting HIP.

EXAMPLES

Figure 2:
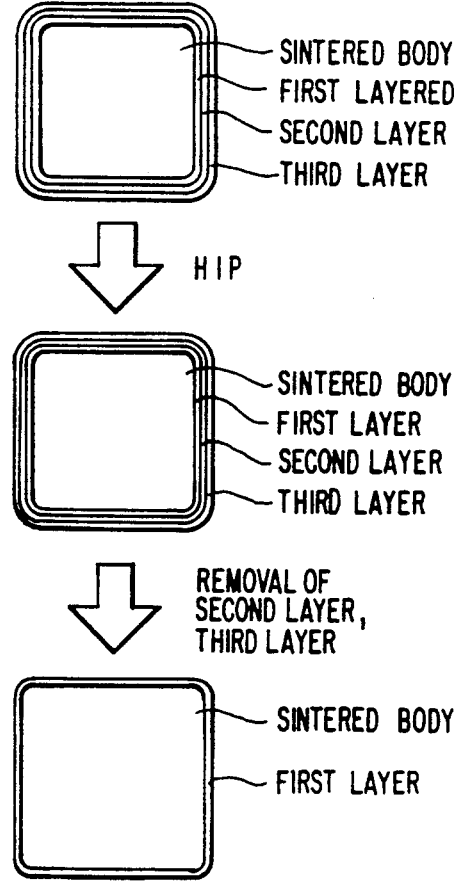
FIG. 2 is a drawing illustrating the flow of the treatment in Examples.

Hereafter, 4 examples are described. The treatment flow common to the 4 examples is illustrated in FIG. 2. Three kinds of coating layers are formed on the surface of the porous body. The first layer is composed of the precursor capable of converting into the ceramic membrane, the second layer is composed of boron nitride to facilitate the removal of the third layer, and the third layer is composed of the precursor capable of converting into the gas-impermeable membrane. After converting the third layer into the gas-impermeable membrane, HIP is conducted to densify the porous body and the first layer. Subsequently, the second layer and the third layer are removed to obtain the sintered body having a ceramic membrane.

EXAMPLE 1

First, 92 wt. % of $Si_3N_4$ powder was mixed with 8 wt. % of $Al_2O_3$ powder in methanol using a ball mill for 24 hours, and dried. Coarse particles were removed from the mixture by passing a 100 mesh sieve. Then, the mixture was filled in a mold, and molded by uniaxial pressing at a pressure of 300 kg/cm² to obtain the porous body of 60 mm × 10 mm × 12 mm. The theoretical density ratio (the ratio of the density of the porous body to the theoretial density) was 58.0%.

5 parts by weight of the mixed powder of 50 wt. % of TiN powder and 50 wt. % of $Si_3N_4$ powder were suspended in 95 parts by weight of isopropanol using a stirring mixer. The procedure of immersing the above porous body in the suspension and taking out followed by drying at room temperature was repeated four times to form the inner layer about 20 μm in thickness. 5 parts by weight of TiN powder was suspended in 95 parts by weight of isopropanol. The procedure of immersing the above porous body on which the inner layer was formed in the suspension and taking out followed by drying at room temperature was repeated six times to form the outer layer about 25 μm in thickness. Thus, the first layer of titanium nitride where the TiN composition varied stepwise was formed.

Subsequently, 5 parts by weight of BN powder was suspended in 95 parts by weight of isopropanol. The porous body where the above first layer was formed was immersed in the suspension and then dried. The procedure was repeated 4 times, and the boron nitride layer was formed on the outer layer of the first layer. The thickness of the second layer was about 20 μm.

10 parts by weight of high silica glass (composition: 98.5 wt. % $SiO_2$, 1.0 wt. % $B_2O_3$, 0.5 wt. % $Al_2O_3$) powder were suspended in 90 parts by weight of isopropanol, and the same procedure as above was repeated 10 times to form the third layer about 100 μm in thickness on the second layer.

Figure 3:
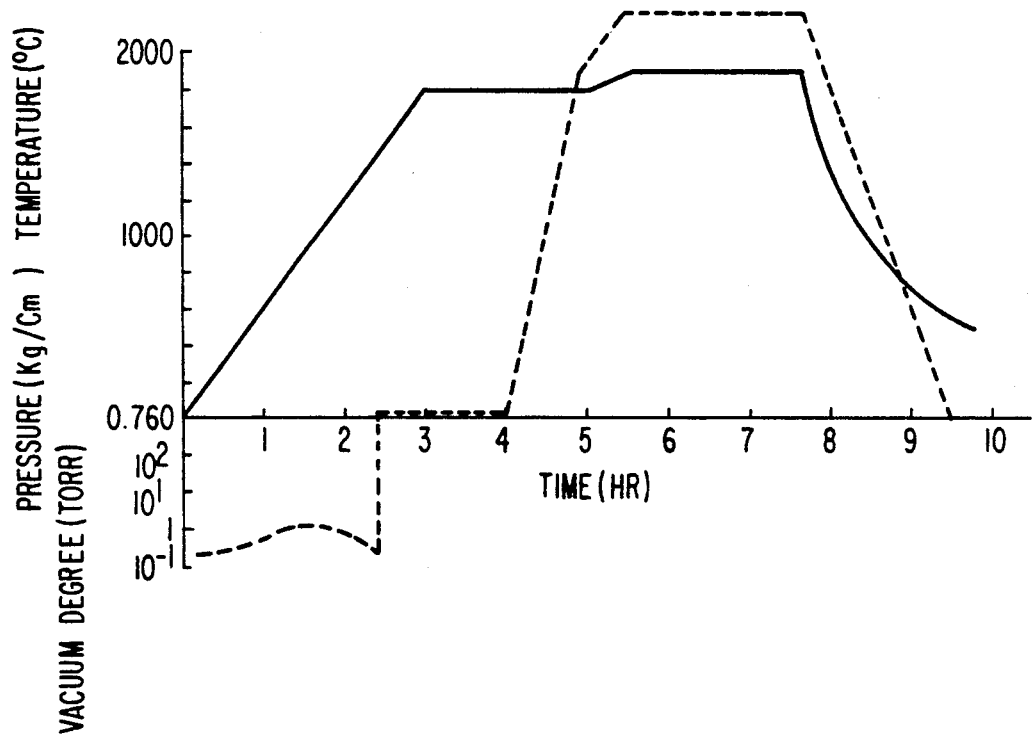
FIG. 3 is a drawing indicating an example of the HIP treatment conditions.
Figure 4:
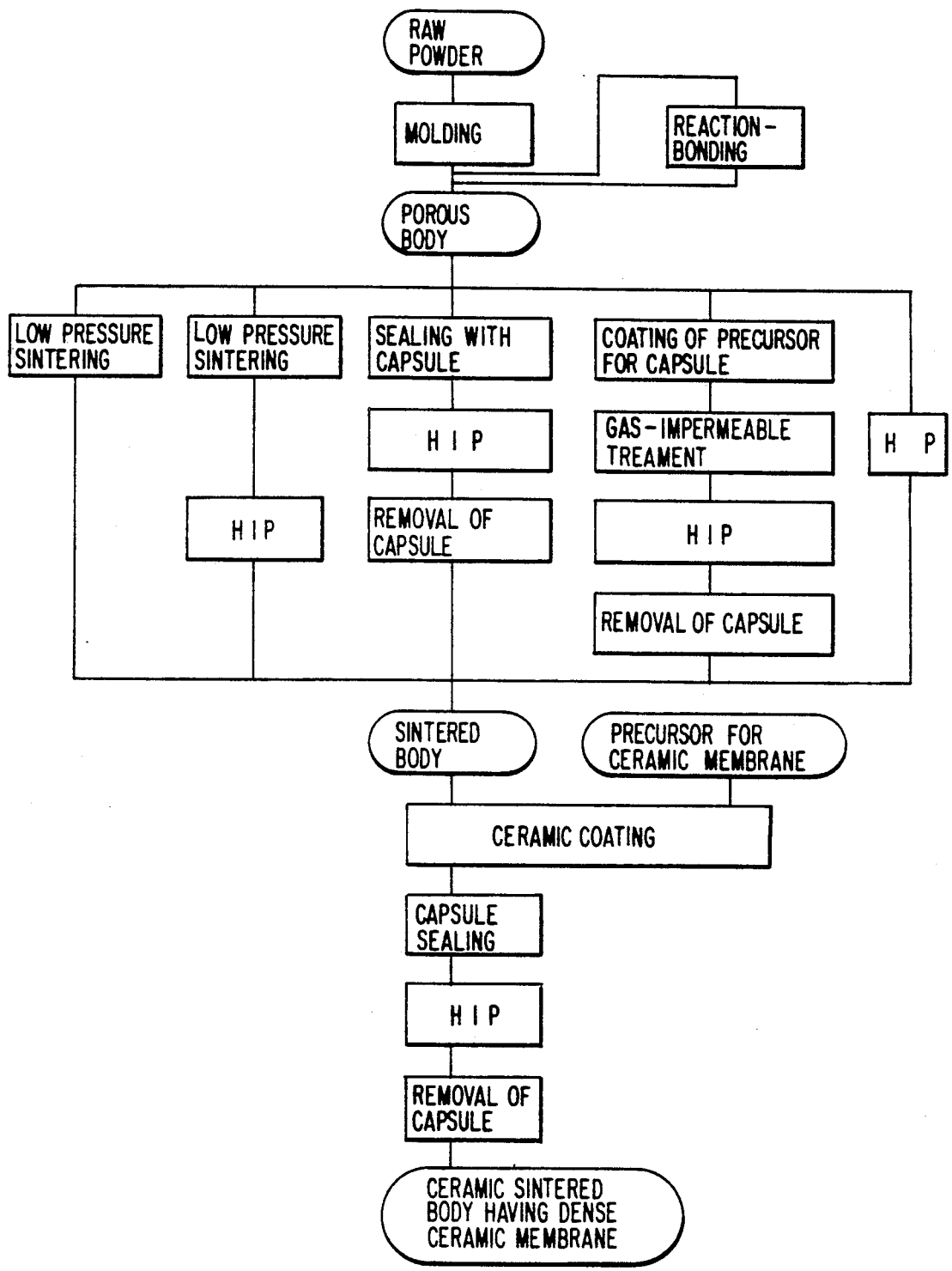
FIG. 4 is a flow sheet indicating the outline of the example of a conventional method.

The porous body thus obtained was placed in a HIP apparatus, and HIP treatment was conducted under the HIP treatment conditions shown in FIG. 3. In the figure, the full line represents temperature, and the dotted line represents pressure. First, the porous body was heated up to 1300° C. with evacuation, and 1 kg cm² (hereafter indicated all by gauge pressure) of nitrogen gas was supplied. Then, the porous body was heated up to 1000° C., and kept at that temperature for 1 hour. Upon continued keeping of the temperature at 1000° C., injection of pressurized gas was started to elevate the gas pressure to 1700 kg/cm². Pressure rise and temperature rise were conducted in parallel to reach 2000 kg/cm², 1700° C., and kept thereat for two hours. Thereafter, pressure reducing and natural cooling were conducted, and the HIP treatment was finished.

When the treated matter was subjected to sandblasting, the third layer was easily removed together with the second layer.

The sintered body thus obtained had the dense titanium nitride membrane on the surface. The thickness of the coating layer was 25-30 μm, and the density of the sintered body was 99.3% of the theoretical density.

EXAMPLE 2

The inner layer composed of 47 wt. % of $ZrO_2$, 13 wt. % of Ce and 50 wt. % of $Si_3N_4$ and the outer layer composed of 74 wt. % of $ZrO_2$ and 26 wt. % of Ce were formed as the first layer on the silicon nitride porous body in the manner similar to Example 1. Furthermore, the second layer of boron nitride and the third layer of high silica glass were formed. The HIP treatment was conducted, and the second and third layers were removed similarly to obtain a sintered body (theoretical density ratio: 99.4%) having a dense zirconia membrane (25°30 μm thick) on the surface.

EXAMPLE 3

The inner layer composed of 50 wt. % of $Cr_3C_2$ and 50 wt. % of $Si_3N_4$ and the outer layer composed of 100 wt. % of $Cr_3C_2$ were formed as the first layer on the silicon nitride porous body in the manner similar to Example 1. Furthermore, the second layer of boron nitride and the third layer of high silica glass were formed. The HIP treatment was conducted, and the second and third layer were removed similarly to obtain a sintered body (theoretical density ratio: 99.2 %) having a dense chromium carbide membrane (25-30 μm thick) on the surface

EXAMPLE 4

The inner layer composed of 50 wt. % of polysilastyrene, 46 wt. % of $Si_3N_4$ and 4 wt. % of $Al_2O_3$ and the outer layer composed of 93 wt. % of polysilastyrene and 7 wt. % of $Al_2O_3$ were formed as the first layer on the silicon nitride porous body in the manner similar to Example 1. Furthermore, the second layer of boron nitride and the third layer of high silica glass were formed. The HIP treatment was conducted, and the second and third layer were removed similarly to obtain a sintered body (theoretical density ratio: 99.6%) having a dense silicon carbide membrane (25-30 μm thick) on the surface.

The conditions and the results of the above four examples are summarized in Table 1.

TABLE 1

| Example | 1 | 2 | 3 | 4 |
|---|---|---|---|---|
| Porous Body Composition | | Silicon Nitride $Si_3N_4$ - 8 wt. % $Al_2O_3$ | | |
| Theoretical Density Ratio (%) | | 58.5 | | |
| First Layer | | | | |
| Inner Layer Composition | Titanium Nitride TiN - 50 wt. % $Si_3N_4$ | Stabilized Zirconia $ZrO_2$ - 13 wt. % Ce - 50 wt. % $Si_3N_4$ | Chromium Carbide $Cr_3C_2$ - 50 wt. % $Si_3N_4$ | Silicon Carbide Polysilastyrene $Si_3N_4$ - 4 wt. % $Al_2O_3$ |
| Outer Layer | TiN | $ZrO_2$ - 27 wt. % Ce | $Cr_3C_2$ | Polysilastyrene 8 wt. % $Al_2O_3$ |
| Second Layer | | Boron Nitride BN | | |
| Third Layer | | High Silica Glass $SiO_2$ - 1.0 wt. % $B_2O_3$ - 0.5 wt. % $Al_2O_3$ Powder | | |
| HIP Treatment Conditions | | FIG. 3 | | |
| Coating Layer Thickness (μm) | | 25-30 | | |
| Theoretical Density of Sintered Body (%) | 99.3 | 99.4 | 99.2 | 99.6 |

Industrial Applicability

As mentioned above, according to the invention, ceramic sintered bodies having a dense membrane of a ceramic which is different from the ceramic constructing the substrate of the sintered body on the surface can be produced efficiently in very short processes.

We claim:

1. A method of producing a ceramic sintered body having a ceramic membrane which comprises a step of applying a precursor capable of conversion into a ceramic membrane having a new function upon heating, said precursor being a member selected from the group consisting of polysilane, polycarbosilane, polysilastyrene, polysilazane, polymethylsilazane, and hydrolyzates of metal alkoxide, said precursor being applied onto at least the portion of said ceramic body where it is desired to impart said function to the surface of the ceramic porous body, a step of applying a material which inhibits bonding of the ceramic membrane to a gas-impermeable membrane upon heating, a step of applying a metal or ceramic precursor over the whole surface of the porous body, which precursor is capable of conversion into the gas-impermeable membrane upon heating, a process step of forming the gas-impermeable membrane by heating, a step of hot isotactic pressing the porous body, and a step of removing said gas-impermeable membrane by physical means.

2. The method of claim 1, which further comprises the step of applying a mixture of the principal component of the ceramic body and the precursor capable of conversion into a ceramic membrane prior to applying the precursor capable of conversion into a ceramic membrane.

3. The method of claim 1, wherein said ceramic membrane improves heat resistance, wear resistance, impact resistance, toughness, or strengthens corrosion resistance of the ceramic sintered body.

4. The method of claim 1, wherein said physical means is sandblasting.

5. The method of claim 1, wherein said physical means is impacting.

6. The method of claim 1, wherein said physical means is scraping.

7. A method of producing a ceramic sintered body having a ceramic membrane which comprises a step of applying a precursor capable of conversion into a ceramic membrane having a new function upon heating, said precursor being applied onto at least the portion of said ceramic body where it is desired to impart said function to the surface of the ceramic porous body, a step of applying a boron nitride material which inhibits bonding of the ceramic membrane to a gas-impermeable membrane upon heating, a step of applying a metal or ceramic precursor over the whole surface of the porous body, which precursor is capable of conversion into the gas-impermeable membrane upon heating, a process step of forming the gas-impermeable membrane by heating, a step of hot isotactic pressing the porous body, and a step of removing said gas-impermeable membrane by physical means.

8. The method of claim 7 wherein the precursor capable of converting into a ceramic membrane is an aggregrate of ceramic particles or metal polymer.

9. The method of claim 7 wherein the precursor capable of converting into a ceramic membrane is a material to form a membrane of stabilized zirconia, titanium nitride, chromium carbide, silicon carbide or titanium diboride.

10. The method of claim 7 wherein the precursor capable of converting into a gas-impermeable membrane is a member selected from silica glass, high silica glass, borosilicate glass, aluminosilicate glass and soda silica glass.

11. The method of claim 7, wherein the material which inhibits bonding of the ceramic membrane to the gas impermeable membrane upon the heating is a material which is difficult to sinter or is weak in strength.

12. The method of claim 7, wherein said boron nitride is in the form of boron nitride powder.

* * * * *